UNITED STATES PATENT OFFICE.

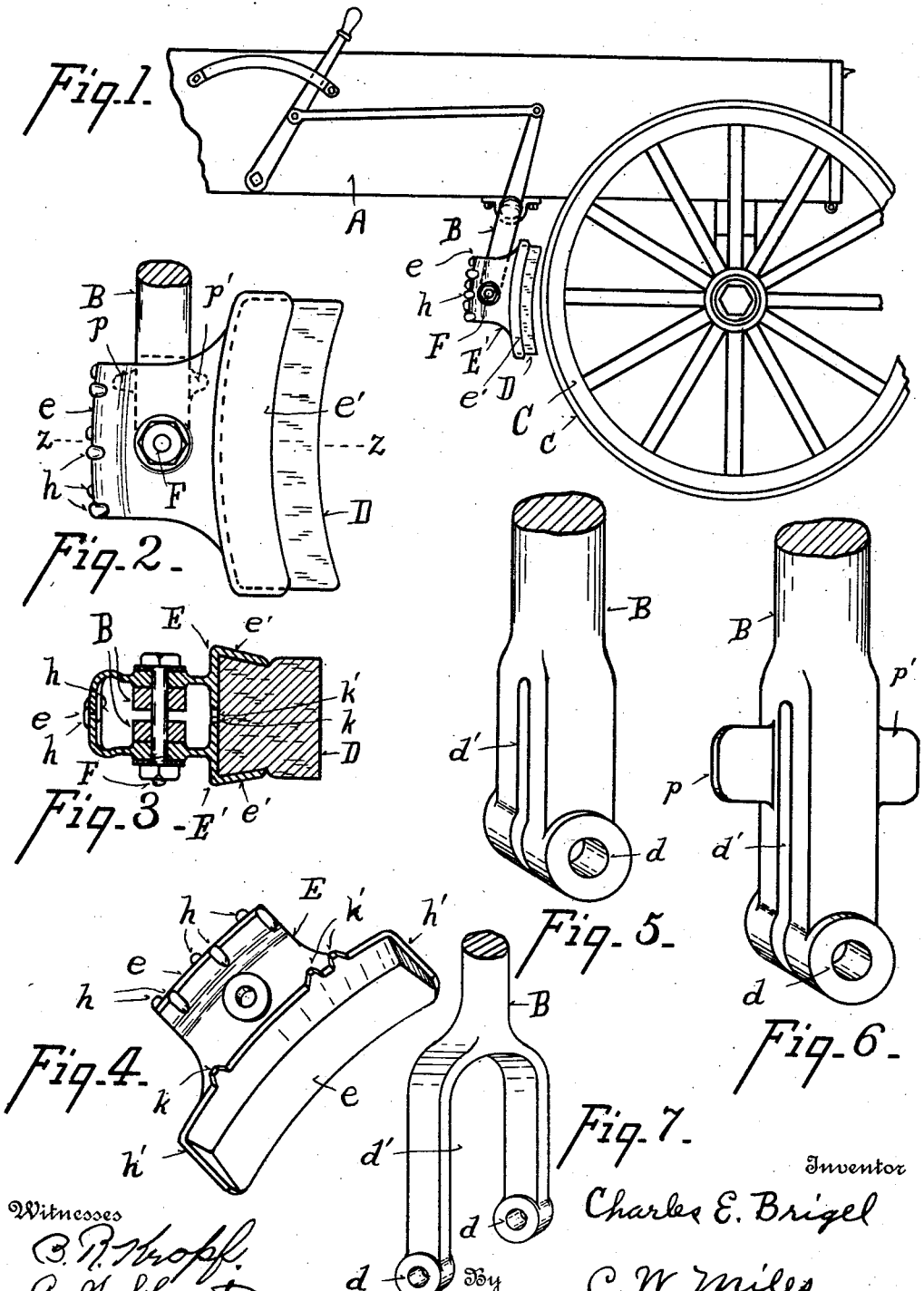

CHARLES E. BRIGEL, OF CINCINNATI, OHIO.

VEHICLE-BRAKE.

997,959.  Specification of Letters Patent.  Patented July 18, 1911.

Application filed September 6, 1910. Serial No. 580,560.

*To all whom it may concern:*

Be it known that I, CHARLES E. BRIGEL, a citizen of the United States, residing at Cincinnati, in the county of Hamilton and State of Ohio, have invented certain new and useful Improvements in Vehicle-Brakes, of which the following is a specification.

My invention relates to improvements in vehicle brakes.

One of its objects is to provide a brake adapted to adjust itself to the wheels irrespective of the movements of the vehicle body with reference to the wheels.

Another object is to provide an improved assembly of the brake shoes and brake blocks upon the brake bar to facilitate replacing worn blocks or defective parts.

Another object is to provide improved brake shoes adapted to be conveniently produced and interchangeable in nature, and to provide for an elastic tension to hold the brake shoes and blocks in place.

Another object is to provide improved means of attaching and tensioning the brake shoes with reference to the brake bar, and limiting the movement of the brake shoes.

It further consists in certain details of form, combination and arrangement, all of which will be more fully set forth in the description of the accompanying drawings, in which:

Figure 1 is a side elevation of a portion of a vehicle with my improvements attached thereto. Fig. 2 is an enlarged side elevation of the brake shoe, block and a portion of the bar in the assembled position. Fig. 3 is a central section through the same on line $z\ z$ of Fig. 2. Fig. 4 is a perspective view of the brake shoe members detached. Fig. 5 is a perspective view of a portion of the brake bar. Fig. 6 is a view similar to Fig. 5 illustrating a modification. Fig. 7 is a view similar to Fig. 5 illustrating another modification.

In the accompanying drawings A represents a vehicle body to which a brake bar B is pivotally attached.

C represents a wheel against the rim or tire of which the brake is to be applied. As the vehicle body is progressively loaded it sinks lower with reference to the wheel C carrying with it the brake and brake bar, hence the brake if carried rigidly by the brake bar would not uniformly engage the tire $c$ along the entire face of the brake block D. I therefore provide a brake shoe having a limited pivotal movement relative to the brake bar in order that the brake block may uniformly seat along its entire face upon the tire. The brake shoe preferably comprises two sections or members E E' which are pierced to receive a bolt F by means of which the brake shoe is assembled and attached to the end of the brake bar. The two sections E E' are preferably counterparts of each other and fulcrum at $e$ on one side of the bolt F and at the other side of the bolt are provided with jaws $e'$ between which jaws the brake block D is clamped. The ends of the brake bar are preferably provided with an eye $d$ through which the bolt F passes, and as illustrated in Figs. 5 and 6 with a slot $d'$ dividing the end of the brake bar into two parts which under the tightening action of the bolt F are adapted to spring slightly toward each other. The members E E' are also adapted to spring slightly toward each other under the tightening action of the bolt F, with the result that the block is at all times firmly clamped between the jaws $e'$ and there is a frictional contact between the faces of the members E E' and the adjacent faces of the forked end of the brake bar, which frictional contact permits the brake block to adjust itself to the wheel so as to bear thereon along its full face, and also when the brake is retracted from the wheel prevents the brake from moving so freely with reference to the brake bar as to permit the brake to tilt so as to make contact between the end of the brake block and the wheel. Thus the brake when applied adjusts itself automatically to the wheel, and when retracted therefrom holds its position with reference to the brake bar until again applied to the wheel. The slot $d'$ is sufficiently narrow so as to limit the extent to which the bolt F may be drawn up, thus preventing crushing or injury to the parts.

The members E E' are preferably duplicate castings and are provided at their fulcruming edges with lugs or projections $h$ which serve to hold the members E E', and particularly their fulcruming edges laterally in position. I also preferably provide interengaging projections $k\ k'$ which when the members E E' are assembled serve to lock the shoe members into alinement in a direction at right angles to that of the projections $h$. The members E E' are also preferably provided with end plates or web $h'$ which engage the ends of the brake blocks to prevent their displacement and enable the use of blocks having the end of the grain presented to the tire, by supporting such blocks endwise and preventing them from splitting apart.

In the modification Fig. 6 and also indicated in dotted line Fig. 2 I have shown projections $p$ $p'$ carried by the end of the brake bar, which serve to engage the brake shoe and limit the extent to which the shoe can be pivotally turned with reference to the brake bar, thus preventing the shoe being accidentally displaced or forced into inoperative position or into contact with the wheel.

In Fig. 7 I have shown a modification in which the opposite ends of the forked brake bar are sufficiently separated to receive the brake shoe members between said forked arms, said arms being adapted to be sprung together by the tightening of the bolt to insure a frictional contact between the faces of the forked arms and the outer faces of the brake shoe members to preserve the desired relation of the parts.

The mechanism herein illustrated and described is capable of considerable modification without departing from the principle of my invention.

Having described my invention, what I claim is;

1. In a vehicle brake, a brake bar, a brake shoe comprising two members adapted to be pivotally attached to the brake bar, said members fulcruming upon each other at one side of said pivot and having jaws to clamp a brake block at the opposite side of said pivot, and a brake block adapted to be held in place between said jaws by clamping said brake shoe members together upon said brake bar.

2. In a vehicle brake, a brake bar, a brake shoe carried by said brake bar and comprising two members fulcrumed together at one edge and provided with clamping jaws at the opposite edge a brake block adapted to be clamped between said jaws, and means interposed between said fulcrum and said jaws to clamp said brake shoe members together.

3. In a vehicle brake, a brake bar, a brake shoe carried by said brake bar, said shoe comprising counterpart members fulcrumed together at one edge and provided with clamping jaws at the opposite edge, a brake block adapted to be clamped between said jaws, and means interposed between said fulcrum and said jaws to clamp said brake shoe members together.

4. In a vehicle brake, a brake bar, a brake shoe carried by said brake bar, said shoe comprising counterpart sections respectively provided with engaging members to retain said sections in alinement and fulcrumed together at one edge and provided with clamping jaws at the opposite edge, a brake block adapted to be clamped between said jaws, and means interposed between said fulcrum and said jaws to clamp said brake shoe sections together.

5. In a vehicle brake, a brake bar, a brake shoe carried by said brake bar, said shoe comprising counterpart sections respectively provided with engaging members at opposite sides of the brake shoe clamping mechanism to retain said sections in alinement, and fulcrumed together at one edge and provided with clamping jaws at the opposite edge, a brake block adapted to be clamped between said jaws, and means interposed between said fulcrum and said jaws to clamp said brake shoe sections together.

6. In a vehicle brake, a brake bar, a brake shoe carried by said brake bar and comprising two members fulcrumed together at one edge and provided with clamping jaws and end supports for a brake block at the opposite edge, a brake block adapted to be clamped between said jaws, and means interposed between said fulcrum and said jaws to clamp said brake shoe members together.

7. In a vehicle brake, a forked brake bar having eyes in opposite ends of said fork for the attachment of a brake shoe, a brake shoe comprising two members adapted to be pivotally attached to the brake bar, said members being fulcrumed together at one side of said pivot and having jaws to clamp a brake block at the opposite side of said pivot, and a brake block adapted to be held in place between said jaws by clamping said brake shoe members together upon said brake bar.

8. In a vehicle brake, a forked brake bar having eyes in opposite ends of said fork for the attachment of a brake shoe, a brake shoe comprising two members adapted to be pivotally attached to the brake bar, said members being fulcrumed together at one side of said pivot and having jaws to clamp a brake block at the opposite side of said pivot, and a brake block adapted to be held in place between said jaws by clamping said brake shoe members together upon said brake bar, said forked arms being adapted to be sprung toward each other by the clamping together of said brake shoe members.

9. In a vehicle brake, a forked brake bar having eyes in opposite ends of said fork for the attachment of a brake shoe, a brake shoe comprising two members adapted to be pivotally attached to the brake bar, said members being fulcrumed together at one side of said pivot, having jaws to clamp a brake block at the opposite side of said pivot, and being adapted to be sprung together intermediate of said fulcrum and jaws to flexibly grasp a brake block, and a brake block adapted to be held in place by clamping said brake shoe members together, said forked arms being adapted to be sprung toward each other with said brake shoe members to maintain a frictional engagement between said forked arms and said brake shoe members.

10. In a vehicle brake, a brake bar, a brake shoe carried by said brake bar and comprising two members fulcrumed together at one edge and provided with clamping jaws at the opposite edge, a brake block adapted to be clamped between said jaws, and means interposed between said fulcrum and said jaws to clamp said brake shoe members together, said block having recesses to receive said jaws.

11. In a vehicle brake, a brake bar, a brake shoe carried by said brake bar and comprising two members fulcrumed together at one edge and provided with clamping jaws at the opposite edge, a brake block having inclined faces to engage said jaws and adapted to be clamped between said jaws, and means interposed between said fulcrum and said jaws to clamp said brake shoe members together.

In testimony whereof I have affixed my signature in presence of two witnesses.

CHARLES E. BRIGEL.

Witnesses:
C. H. BARTH,
W. THORNTON BOGERT.

---

Copies of this patent may be obtained for five cents each, by addressing the "Commissioner of Patents, Washington, D. C."